United States Patent
Tsuneyoshi et al.

(10) Patent No.: US 6,653,758 B2
(45) Date of Patent: Nov. 25, 2003

(54) STATOR STRUCTURE FOR ROTARY ELECTRIC MACHINE

(75) Inventors: Takashi Tsuneyoshi, Yokohama (JP); Shinichiro Kitada, Tokyo (JP); Toshio Kikuchi, Yokosuka (JP); Yutaro Kaneko, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/201,270

(22) Filed: Jul. 24, 2002

(65) Prior Publication Data

US 2003/0042817 A1 Mar. 6, 2003

(30) Foreign Application Priority Data

Aug. 28, 2001 (JP) ........................................ 2001-257151

(51) Int. Cl.$^7$ ................................................. H02K 1/06
(52) U.S. Cl. ........................ 310/216; 310/217; 310/218; 310/258; 310/259; 310/254
(58) Field of Search .................................. 310/216, 217, 310/218, 254, 258, 259

(56) References Cited

U.S. PATENT DOCUMENTS

| | | | | |
|---|---|---|---|---|
| 5,583,387 A | * | 12/1996 | Takeuchi et al. | 310/217 |
| 5,729,072 A | * | 3/1998 | Hirano et al. | 310/258 |
| 6,448,682 B2 | * | 9/2002 | Sakagami et al. | 310/216 |
| 6,495,936 B2 | * | 12/2002 | Kikuchi et al. | 310/58 |

FOREIGN PATENT DOCUMENTS

JP 4-364343 A 12/1992

* cited by examiner

Primary Examiner—Thomas M. Dougherty
Assistant Examiner—Leda Pham
(74) Attorney, Agent, or Firm—Shinjyu Global IP Counselors, LLP (57) ABSTRACT

A stator structure is provided with a stator core having a plurality of cooling passages or slots and an annular resin layer formed on an inner peripheral surface of the stator core that defines a rotor receiving opening. The stator core has a plurality of protrusions disposed on the inner peripheral surface of the stator core to control the depth of the annular resin layer formed on the inner peripheral surface of the stator core. The protrusions have radial thicknesses that are substantially equal to the radial thickness of the annular resin layer.

11 Claims, 8 Drawing Sheets

STATOR STRUCTURE FOR ROTARY ELECTRIC MACHINE

BACKGROUND OF THE INVENTION

1. Field of the Invention

The present invention generally relates to a rotary electric machine. More specifically, the present invention relates to a stator structure for a rotary electric machine having medium cooling passages.

2. Background Information

An example of a rotary electric machine or motor is disclosed in Japanese Laid-Open Patent Publication No. 4-364343. In this publication, the rotary electric machine has a stator with the stator slots (grooves that house the coils) being used as cooling medium passages so that the stator coils and the stator can be cooled directly in order to cool the rotary electric machine efficiently.

In the rotary electric machine of Japanese Laid-Open Patent Publication No. 4-364343, molds are arranged adjacent an inner peripheral surface of the stator and located within the axial slots of the stator core, and then an engineering plastic material is injected to fill the space defined by the stator core and the molds. Once the plastic material has hardened, the slot openings in the stator core are blocked by the plastic material so that axial cooling medium passages are formed in the stator core.

In view of the above, there exists a need for an improved stator structure having cooling passages for use with a rotary electric machine. This invention addresses this need in the art as well as other needs, which will become apparent to those skilled in the art from this disclosure.

SUMMARY OF THE INVENTION

It has been discovered that in order to mold a resin material on the inside surface of a stator core, a mold having a slightly smaller diameter than the inside surface of the stator core is arranged inside the stator core, and then an annular space between the mold and the stator core is filled with the resin material. However, it is difficult to manage the process to make the thickness of the resin material uniform around the inner circumference of the stator core. Also it is difficult to form a thin resin film that does not interfere with a rotor that rotates inside the stator core. Also, if the adhesion between the stator core and the resin material is poor, then the liquid sealing performance of the cooling medium passages in the stator core will degrade and the cooling medium may leak out.

Thus, one object of the present invention is to provide a stator structure for use with a rotary electric machine that solves the above-noted problems.

In accordance with one aspect of the present invention, a stator structure for a rotary electric machine basically comprises an annular stator core, a plurality of protrusions, and an annular resin layer. The annular stator core includes a plurality of axially extending slots and an inner peripheral surface defining a rotor receiving opening with a center axis. The protrusions extend from the inner peripheral surface of the stator core. The protrusions have a predetermined radial thickness. The annular resin layer is formed on the inner peripheral surface of the stator core. The annular resin layer has a radial thickness along inner peripheral surface of the stator core that is substantially equal to the radial thickness of the protrusions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
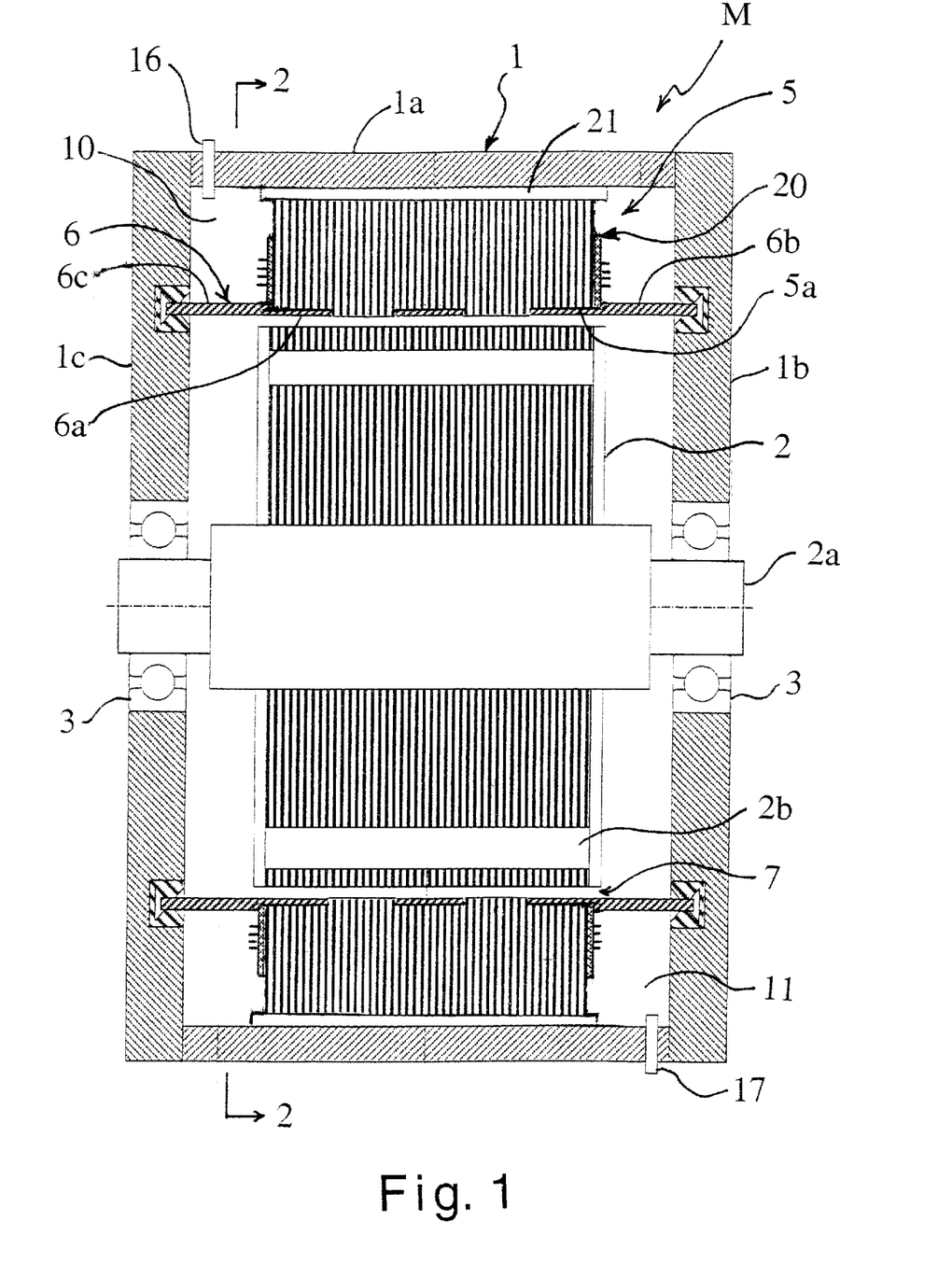
FIG. 1 is a longitudinal cross-sectional view showing a rotary electric machine with a stator core constructed in accordance with a first embodiment of the present invention.
Figure 2:
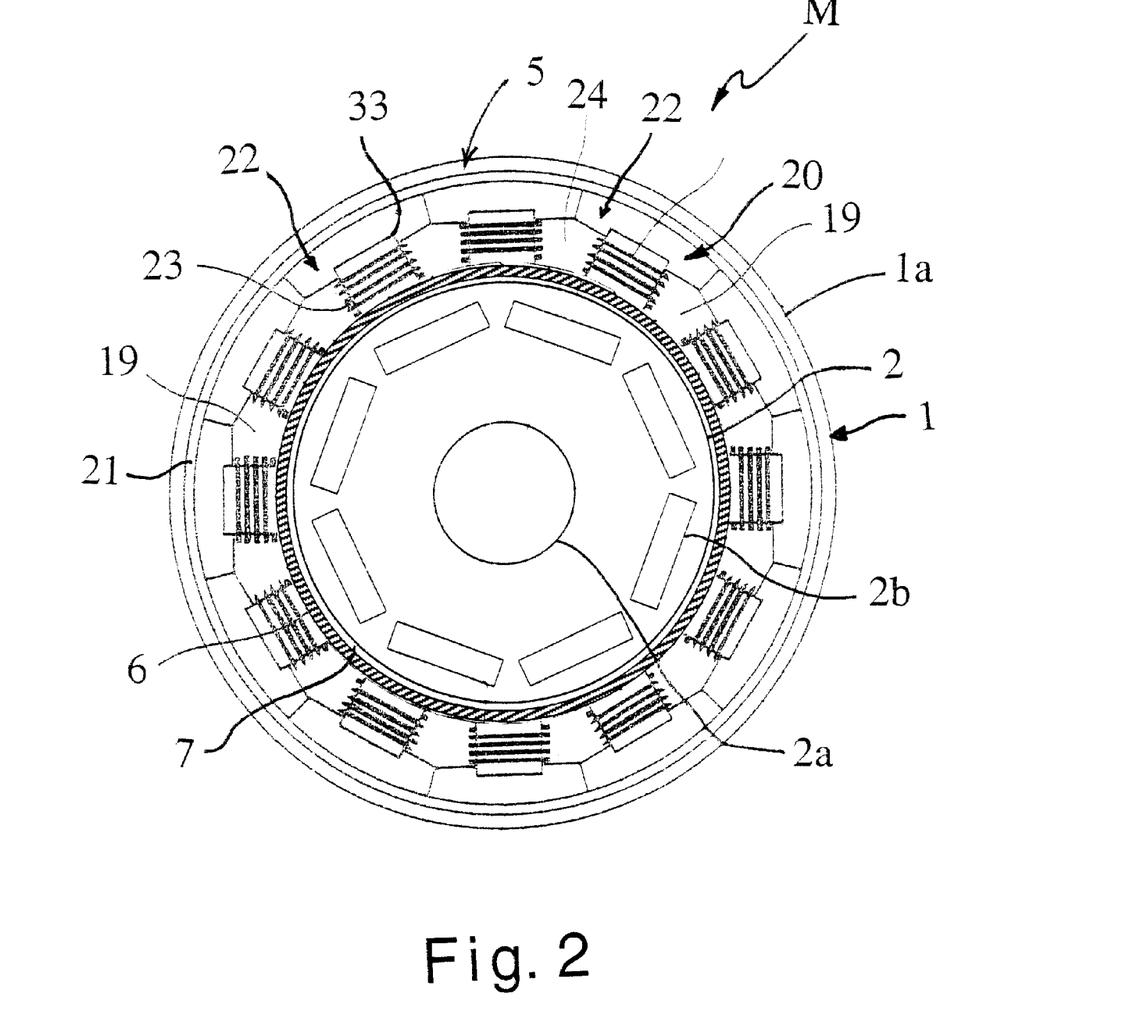
FIG. 2 is a transverse cross-sectional view showing the rotary electric machine as viewed along section line 2—2 of FIG. 1.

Referring initially to FIGS. 1 and 2, a rotary electric machine or motor M is illustrated in accordance with a first embodiment of the present invention. In the illustrated embodiment, the rotary electric machine M is a permanent magnet type synchronous electric motor. Of course, it will be apparent to those skilled in the art from this disclosure that although the rotary electric machine M is illustrated as a permanent magnet type synchronous electric motor, the present invention can also be applied to other motors, such as induction motors and SR motors. Furthermore, it will be apparent to those skilled in the art from this disclosure that although the present invention is used with an electric motor, the present invention can be used with other rotary electric machine such as a generator or motor/generator. FIG. 1 shows a longitudinal cross-sectional view of the rotary electric machine M, while FIG. 2 shows a transverse cross-sectional view of the rotary electric machine M.

As seen in FIGS. 1 and 2, the rotary electric machine M basically comprises a machine case or housing 1, a cylindrical rotor 2 rotatably mounted in the housing 1 by a pair of bearings 3, and a stator 5 fixedly secured in the housing 1 to surround the rotor 2.

In describing the rotary electric machine M of the present invention, the following directional terms "axial, circumferential, radial, longitudinal and transverse" as well as other similar directional terms will be used. As used herein, these directional terms as well as all other directional terms refer to those directions of the electric machine M relative to the center rotational axis of the rotor 2 of the electric machine M. Accordingly, these terms, as utilized to describe the present invention should be interpreted relative to the center rotational axis of the rotor 2 of the electric machine M.

A cylindrical sealing member 6 is coupled between the housing 1 and the stator 5 to separate the housing 1 into an inner section containing the rotor 2 and an outer section containing the stator 5. The outer section of the housing 1 has a cooling medium or liquid flowing there through for cooling the stator 5. The sealing member 6 is preferably, a one-piece, unitary sealing member that is molded from a resin material onto an inner peripheral surface 5a of the stator 5. The sealing member 6 basically includes a cylindrical center sealing section or thin resin layer 6a, a first cylindrical end sealing section 6b and a second cylindrical end sealing section 6c. The end sealing sections 6b and 6c are annular seals that are attached to the housing 1 in a fluid tight manner.

As explained below, the center sealing section or resin layer 6a of the sealing member 6 is molded onto the inner peripheral surface 5a of the stator 5 such that leakage of the cooling liquid passing through the stator 5 can be reliably prevented. Also, in the present invention, the center sealing section or resin layer 6a of the sealing member 6 is molded onto the inner peripheral surface 5a of the stator 5 such that any interference between the rotor 2 and the resin layer 6a on the inner peripheral surface 5a of the stator 5 can be reliably prevented because the thickness of the resin layer 6a is uniformly formed along the inner peripheral surface 5a of the stator 5.

As seen in FIG. 1, the housing 1 of the rotary electric machine M basically comprises a cylindrical plate 1a and a pair of side plates 1b and 1c fixedly coupled at first and second axially facing ends of the cylindrical plate 1a. The end sealing sections 6b and 6c are attached to the side plates 1b and 1c of the housing 1, respectively, in a fluid tight manner.

Thus, two annular cooling jackets 10 and 11 are formed within the housing 1 at the axial ends of the stator 5. More specifically, the cooling jackets 10 and 11 comprise the annular spaces formed between the inside surface of the cylindrical plate 1a of the housing 1 and the end sealing sections 6b and 6c of the sealing member 6 in the radial direction and the axially facing ends of the stator 5 and the side plates 1b and 1c of the housing 1 in the axial direction. Cooling oil, not shown, is supplied to the cooling jacket 10 through an oil supply port 16 that passes through the cylindrical plate 1a of the housing 1 into the cooling jacket 10. As discussed below in more detail, the cooling oil flows through axially extending cooling medium paths 19 formed between the stator 5 and the thin resin layer 6a overlying an inner peripheral surface 5a of the stator 5, as shown in FIG. 2. The cooling medium paths 19 fluidly connect cooling jackets 10 and 11 together. The cooling oil is then discharged to the outside through an oil discharge port 17 that passes through the cylindrical plate 1a into the cooling jacket 11. The cooling oil cools the stator 5 as it flows in the manner just described.

The rotor 2 is housed inside the housing 1 so as to rotate relative to the housing 1 and the stator 5. The rotor 2 has a rotational shaft 2a with its first and second ends supported on the side plates 1b and 1c via the bearings 3, such that the rotor 2 can rotate freely with the rotational shaft 2a about the center axis of the rotor 2. The rotor 2 further includes a plurality (eight) of permanent magnets 2b as seen in FIGS. 1 and 2.

The stator 5 is cylindrically shaped member that is fixedly arranged inside the cylindrical plate 1a to surround the outside surface of the rotor 2. A prescribed gap 7 is provided between the thin resin layer 6a formed on the inner peripheral surface 5a of the stator 5 and an outside surface of the rotor 2.

The stator 5 basically comprises a cylindrical stator core 20 formed of a cylinder member 21 with a plurality of stator core sections 22 circumferentially arranged therein and a plurality of stator coils 23 wound through a plurality of slots 24 formed between adjacent pairs of the stator core sections 22. Thus, the stator coils 23 are housed inside the slots 24 of the stator core 20 in a concentrated manner.

The slots 24 are used as the cooling medium paths 19 through which cooling oil passes from the cooling jacket 10 to the cooling jacket 11. In particular, as previously mentioned, the thin resin layer 6a of the sealing member 6 overlies the inner peripheral surface 5a of the stator 5. Thus, the thin resin layer 6a of the sealing member 6 is a sealing layer that blocks or seals the inner radial openings 27 of the slots 24 to form the cooling medium paths 19 that extend axially between the cooling jackets 10 and 11.

In order to form the cooling jackets 10 and 11, the sealing member 6 is formed from a resin material in which the center sealing section or thin resin layer 6a extends along the inside surface (i.e., inner peripheral surface 5a) of the stator 5 and the end sealing sections 6b and 6c extends outwardly from the axially facing ends of the stator 5. The end sealing sections 6b and 6c are attached to the side plates 1b and 1c of the housing 1, respectively, in a fluid tight manner. In other words, the sealing member 6 extends outwardly from the axially facing ends of the stator 5 and contact annular recesses in the side plates 1b and 1c of the housing 1 to form the cooling jackets 10 and 11 between the inside of the cylindrical plate 1a of the housing 1 and the axially facing ends of the stator 5.

In this embodiment, the stator core 20 is a divided structure formed of the circumferentially arranged stator core sections 22 located in the cylinder member 21. In other words, the stator core 20 includes a prescribed number (twelve in this embodiment) of the stator core sections 22 that are circumferentially linked together in a ring shape (divided core structure) with in the cylinder member 21. Of course, it will be apparent to those skilled in the art from this disclosure that instead of using the divided structure (the stator core sections 22 and the cylinder member 21) illustrated herein, an integral structure can be used for the stator core 20.

Each stator core section 22 is preferably T-shaped when viewed in the axial direction of the stator core 20 as seen in FIG. 2. Each stator core section 22 has an outer back core part 22a and a radially extending tooth part 22b that protrudes inwardly from the back core part 22a in a radial direction. The back core parts 22a of the stator core sections 22 are circumferentially arranged to form a ring shape that follows the inside surface of the cylinder member 21 that is concentric with the cylindrical plate 1a of the housing 1 as seen in FIGS. 1 and 2.

Figure 3:
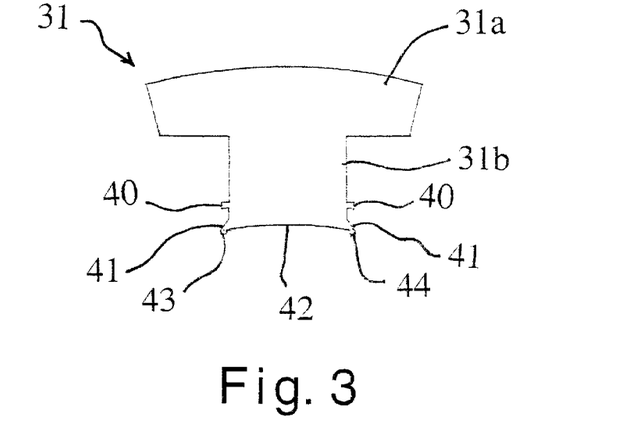
FIG. 3 is an end view showing one of the first magnetic core plates used in constructing the stator core sections of the stator core of the rotary electric machine shown in FIG. 1.
Figure 4:
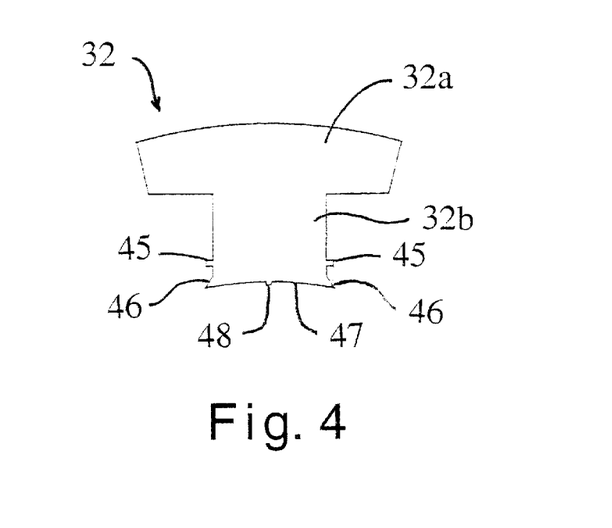
FIG. 4 is an end view showing one of the second magnetic core plates used in constructing the stator core sections of the stator core of the rotary electric machine shown in FIG. 1.
Figure 6:
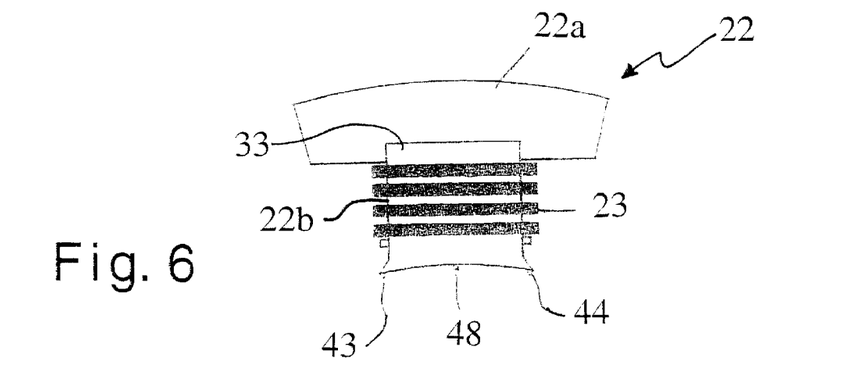
FIG. 6 is an end view showing one of the stator core sections of the stator of the rotary electric machine shown in FIG. 1.
Figure 7:
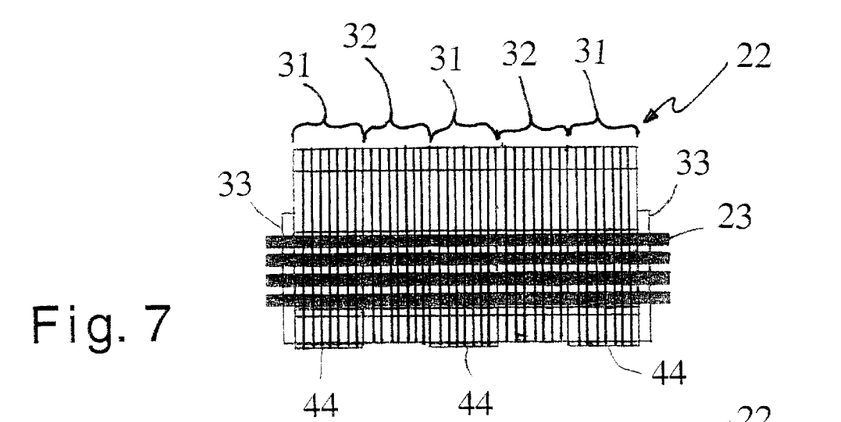
FIG. 7 is a side view showing the stator core section shown in FIG. 6.
Figure 8:
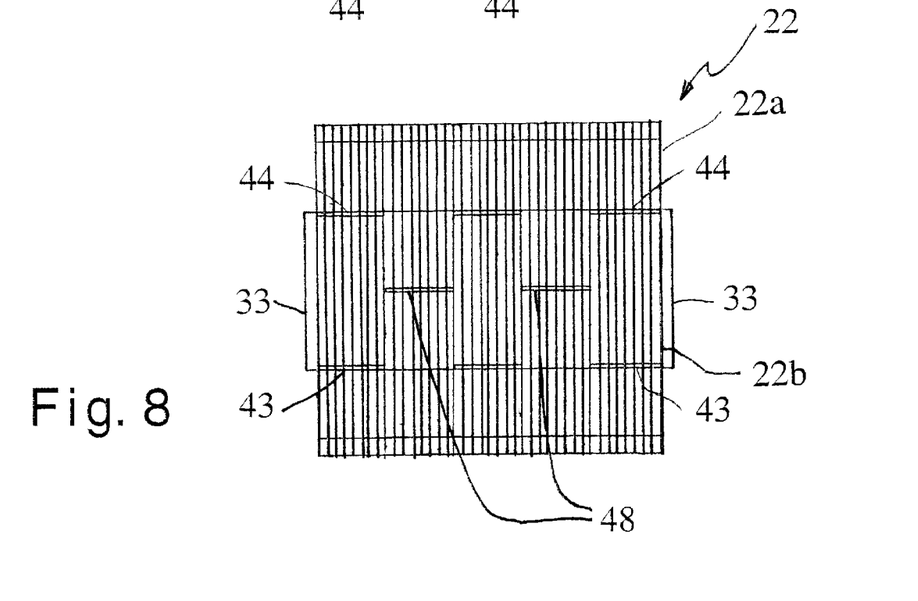
FIG. 8 is a bottom view showing the stator core section of FIGS. 6 and 7 with the stator coil removed for purposes of illustration.
Figure 9:
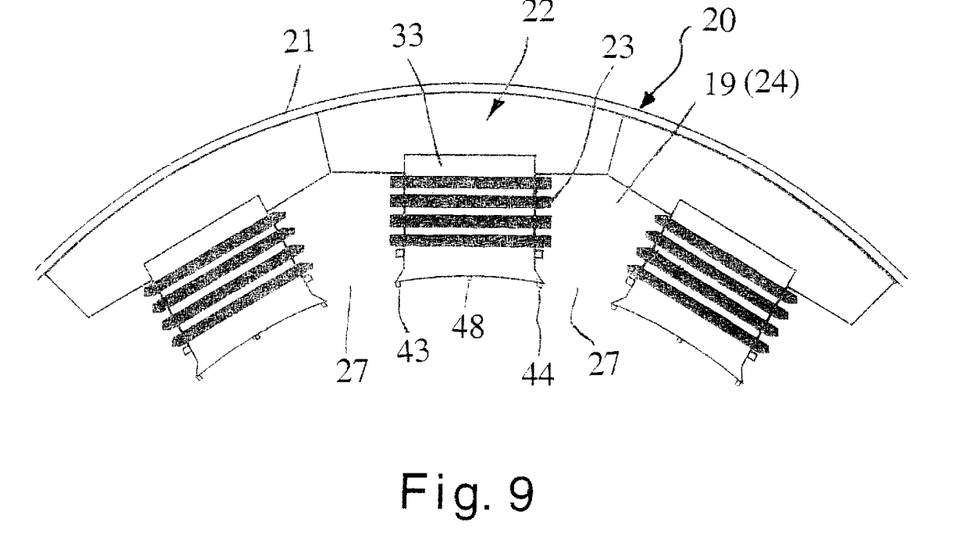
FIG. 9 is a partial end view of a partially assembled stator showing a plurality of stator core sections installed in a cylinder member that is to be installed in the rotary electric machine of FIG. 1.
Figure 10:
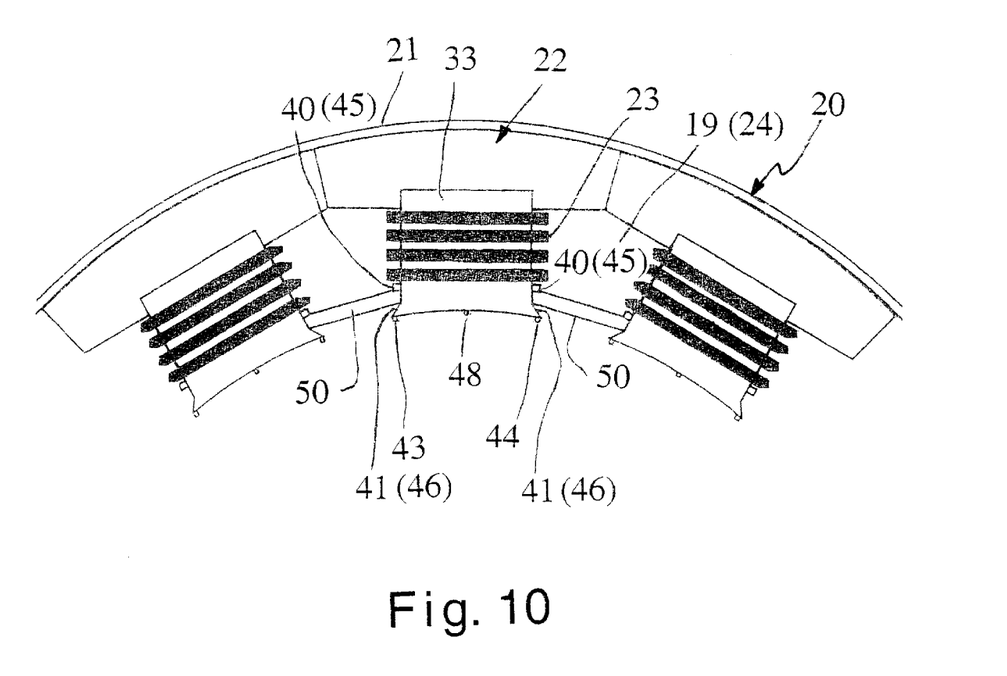
FIG. 10 is a partial end view of a partially assembled stator showing plates installed between adjacent pairs of the stator core sections to be installed in the rotary electric machine of FIG. 1.

Referring now to FIGS. 6–8, each of the stator core sections 22 is preferably formed by a plurality of magnetic steel core plates 31 and 32 laminated or layered in the axial direction located between a pair of end plates 33. In particular, each stator core section 22 includes a plurality of first magnetic core plates 31 that are laminated or layered in an axial direction of the stator core 20 and a plurality of second magnetic core plates 32 that are laminated or layered in an axial direction of the stator core 20. Each of the first magnetic core plates 31 has a first substantially T-shaped peripheral edge as seen in FIG. 3, while each of the second magnetic core plates 32 has a second substantially T-shaped peripheral edge as seen in FIG. 4. Preferably, the end plates 33 and the first and second magnetic core plates 31 and 32 are all formed by die-punching.

As seen in FIGS. 7 and 8, each of the stator core sections 22 is preferably constructed of three sets of a prescribed number of the first magnetic core plates 31 axially layered together and two sets of a prescribed number of the second magnetic core plates 32 axially layered together, with the sets of the second magnetic core plates 32 being located between the three sets of a prescribed number of the first magnetic core plates 31 in an alternating manner. Of course, it will be apparent to those skilled in the art from this disclosure that fewer or more sets of first and second magnetic core plates 31 and 32 can be arranged in an alternating manner between the end plates 33 to form each of the stator core sections 22, as needed and/or desired. Preferably, each of the sets of the first magnetic core plates 31 includes the same number of plates, and each of the sets of the second magnetic core plates 32 includes the same number of plates. Moreover, it is preferably that each of the sets of the first magnetic core plates 31 has the same number of plates as each of the sets of the second magnetic core plates 32.

As shown in FIG. 3, each of the first magnetic core plates 31 is a substantially T-shaped member that has an outer back core part 31a and a radially extending tooth part 31b that protrudes inwardly from the back core part 31a in a radial direction. Likewise, as shown in FIG. 4, each of the second magnetic core plates 32 is a substantially T-shaped member that has an outer back core part 32a and a radially extending tooth part 32b that protrudes inwardly from the back core part 32a in a radial direction. The outer back core parts 31a and 32a of the first and second magnetic core plates 31 and 32 form the outer back core part 22a of the stator core section 22 when they are axially laminated or layer together as mentioned above and as shown in FIGS. 7 and 8. The tooth parts 31b and 32b of the first and second magnetic core plates 31 and 32 form the tooth part 22b of the stator core section 22 when they are axially laminated or layer together as mentioned above and as shown in FIGS. 7 and 8.

Figure 5:
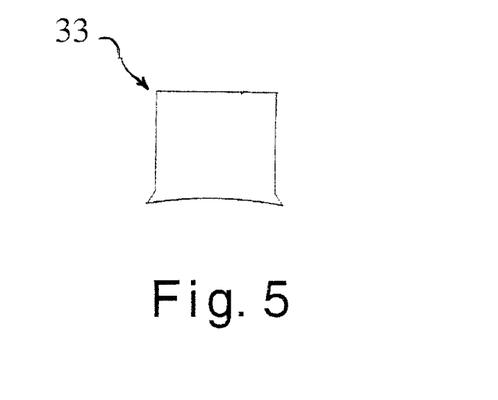
FIG. 5 is an end view showing one of the end plates used in constructing the stator core sections of the stator core of the rotary electric machine of FIG. 1.

As best seen in FIGS. 5, 6 and 8, each of the end plates 33 has the same circumferential width as the tooth parts 31b and 32b of the first and second magnetic core plates 31 and 32. The end plates 33 are arranged to form both axially facing ends of the stator core section 22 as shown in FIG. 7. The width of the end plates 33 is shown vertically in FIG. 8. As shown in FIGS. 6 and 7, the coils 23 are wrapped around the stator core sections 22 on the outside of the end plates 33. As a result, the end plates 33 are integrally coupled to the stator core sections 22. In order to increase the adhesion between the mating surfaces of the sealing member 6 and the end plates 33 that are arranged at both axially facing ends of each of the stator core sections 22, the end plates 33 are made of a nonconductive material. This nonconductive material has better adhesion with the resin material of the sealing member 6 than with the magnetic (conductive) material of the first and second magnetic core plates 31 and 32 of the stator core sections 22.

Referring again to FIG. 3, each of the circumferentially facing sides of the first magnetic core plates 31 has a pair of side protrusions 40 and 41 located in the vicinity of its tip portion of the tooth part 31b. More specifically, the protrusions 40 and 41 extend outwardly from first and second circumferentially facing sides of the tooth part 31b in an area spaced slightly outward in a radial direction from the tooth part 31b. Furthermore, the tooth part 31b of each of the first magnetic core plates 31 has a circumferentially curved bottom surface 42 with a pair of protrusions 43 and 44 extending from the bottom surface 42 in a radial direction toward the outer circumferential surface of the rotor 2. In other words, each of the protrusions 43 and 44 has a radial thickness or axial length that is measured from the bottom surface 42 to its free end in a substantially radial direction passing through the center axis of rotation of the rotor 2. Preferably, the radial thicknesses of the protrusions 43 and 44 are equal to each other and equal to the radial thickness of the thin resin layer 6a of the sealing member 6. The protrusions 43 and 44 of the first magnetic core plates 31 are preferably located at first and second circumferential ends of the bottom surface 42 of each of the first magnetic core plates 31.

Referring again to FIG. 4, each of the circumferentially facing sides of the second magnetic core plates 32 has a pair of protrusions 45 and 46 located in the vicinity of its tip portion of the tooth part 32b. More specifically, the protrusions 45 and 46 extend outwardly from first and second circumferentially facing sides of the tooth part 32b in an area spaced slightly outward in a radial direction from the tooth part 32b. The protrusions 45 and 46 of the second magnetic core plates 32 are aligned in the axial direction with the protrusions 40 and 41 of the first magnetic core plates 31 when the plurality of sets of the first and second magnetic core plates 31 and 32 are laminated together in an axial direction. Furthermore, the tooth part 32b of each of the second magnetic core plates 32 has a circumferentially curved bottom surface 47 with a centrally located protrusion 48 extending from the bottom surface 47 in a radial direction toward the outer circumferential surface of the rotor 2. In other words, the protrusion 48 has a radial thickness or axial length that is measured from the bottom surface 47 to its free end in a substantially radial direction passing through the center axis of rotation of the rotor 2. Preferably, the radial thickness of the protrusion 48 is equal to the radial thicknesses of the protrusions 43 and 44 of the first magnetic core plates 31 which are also equal to the radial thickness of the thin resin layer 6a of the sealing member 6.

Accordingly, the bottom surfaces 42 and 47 of the first and second magnetic core plates 31 and 32, respectively, form the inner peripheral surface 5a of the stator 5. Thus, the protrusions 43 and 44 of the first magnetic core plates 31 and the protrusions 48 of the second magnetic core plates 32 project radially from the inner peripheral surface 5a of the stator 5. These protrusions 43, 44 and 48 ensure that the thin resin layer 6a of the sealing member 6 is securely formed and retained on the inner peripheral surface 5a of the stator 5.

As a result, the protrusions 43, 44 and 48 on inner peripheral surface 5a of the stator core 20 increase the adhesion between the stator core 20 and the resin layer 6a and improve the sealing performance with respect to the cooling liquid. Also, by providing these protrusions 43, 44 and 48 in different positions, the quality of the joint between the resin layer 6a and the stator 5 can be improved at all regions of on the inner peripheral surface 5a of the stator 5. In other words, the protrusions 43, 44 and 48 increase the adhesion between mating surfaces of the resin layer 6a and the stator core 20. Thus, separation of the mating surfaces caused by vibrations and the like does not occur and the durability and reliability thereof improves.

Furthermore, providing the protrusions 43, 44 and 48 on the laminated structure of the stator 5 improves the sealing performance with respect to the cooling liquid. In particular, when the stator core sections 22 of the present invention are laminated, leakage of the cooling liquid from the slots 24 of the stator 5 into the area of the rotor 2 can be reliably prevented because the entire inner peripheral surface 5a of the stator 5 is covered with the resin layer 6a having the same thickness as the radial lengths or thicknesses of the protrusions 43, 44 and 48.

Moreover, these protrusions 43, 44 and 48 act as depth gauges during the molding process of the resin layer 6a on the inner peripheral surface 5a of the stator 5. Thus, in the present invention, interference between the resin layer 6a and the rotor 2 that rotates inside the stator 5 can be reliably prevented because the thickness of the resin layer 6a is substantially uniform along the inner peripheral surface 5a of the stator 5. The protrusions 43, 44 and 48 can be easily manufactured by forming them integrally when the first and second magnetic core plates 31 and 32 are die punched. Also, in the invention, manufacturing of the stator 5 is simplified and the cost is reduced because the protrusions 43, 44 and 48 are formed simultaneously with the die punching of the first and second magnetic core plates 31 and 32 that form the stator core 20.

Now, the process for manufacturing a stator structure in which the resin sealing member 6 is molded or formed onto the stator core 20 will be described in more detail based on FIGS. 6–14. Preferably conventional injection molding techniques are used to mold the resin sealing member 6 onto the stator core 20.

First, the stator core 20 is constructed by assembling each of the stator core sections 22 using the end plates 33 and the first and second magnetic core plates 31 and 32. Preferably, the end plates 33 and the first and second magnetic core plates 31 and 32 are all formed by die-punching. More specifically, a prescribed number of the first magnetic core plates 31 are axially layered or laminated together to form a prescribed number of sets of the first magnetic core plates 31 and a prescribed number of the second magnetic core plates 32 are axially layered or laminated together to form a prescribed number of sets of the second magnetic core plates 32. Three of the sets of the first magnetic core plates 31 are arranged in an alternating manner with two sets of the second magnetic core plates 32 for each of the stator core sections 22.

Accordingly, once the stator core sections 22 are assembled, the bottom surfaces 42 and 47 of the first and second magnetic core plates 31 and 32, respectively, form a portion of the inner peripheral surface 5a of the stator 5. Moreover, once the stator core sections 22 are assembled, the protrusions 43 and 44 of the first magnetic core plates 31 are aligned to form a set of first axially arranged projections having a prescribed axial length in an axial direction of the stator 5. Likewise, the protrusions 48 of the second magnetic core plates 32 are aligned to form a set of second axially arranged projections having a prescribed axial length in an axial direction of the stator 5. Thus, in the illustrated embodiment, each of the stator core sections 22 has six of first axially arranged projections formed of the protrusions 43 and 44 and four of the second axially arranged projections formed of the protrusions 48. Preferably, the prescribed axial lengths of the axially arranged projections are all equal their in axial lengths.

Next, the end plates 33 are installed onto the axial ends of each of the stator core sections 22. As best seen in FIGS. 4, 6 and 8, each of the end plates 33 has the same circumferential width as the tooth parts 31b and 32b of the first and second magnetic core plates 31 and 32. The end plates 33 are arranged to form both axially facing ends of the stator core section 22 as shown in FIG. 7. As shown in FIGS. 6 and 7, the stator coils 23 are wrapped around the stator core sections 22 on the outside of the end plates 33. As a result, the end plates 33 are integrally coupled to the stator core sections 22.

After the stator core sections 22 are assembled with the end plates 33 and the stator coils 23, the stator core sections 22 are circumferentially arranged in the cylinder member 21 such that the bottom surfaces 42 and 47 of the first and second magnetic core plates 31 and 32, respectively, that form the stator core sections 22 also form the inner peripheral surface 5a of the stator 5. The stator core sections 22 also define a rotor receiving opening that receives the rotor 2 therein. Alternatively, the stator core sections 22 can be circumferentially arranged directly in the cylindrical plate 1a, i.e., the cylinder member 21 is eliminated.

Now, as shown in FIGS. 6 and 7, an elongated plate 50 is inserted into each of the slots 24 to block the inner radial openings 27 of the slots 24 formed by the adjacent pairs of the tooth parts 22b. The plates 50 are installed between adjacent pairs of the tooth parts 22b such that the stator coils 23 located radially outwardly of the plates 50. Each plate 50 closes the inner radial openings 27 of each of the slots 24 formed by the stator core 20 so that the resin layer 6a of the sealing member 6 does not fill the slots 24 during the resin molding process of the sealing member 6. As a result, after the resin layer 6a of the sealing member 6 seals the plates 50 to the tips of the tooth parts 22b, the cooling medium paths 19 are formed that allow cooling liquid to pass through the insides of the slots 24. The plates 50 are held by the protrusions 40, 41, 45 and 46 formed in the vicinity of the tips of the adjacent pairs of the tooth parts 22b. In particular, when the first and second magnetic core plates 31 and 32 are laminated together to form the stator core sections 22, the protrusions 40 and 45 of each of the tooth parts 22b are axially aligned with each other to form a pair of first axially extending ribs, and the protrusions 41 and 46 of each of the tooth parts 22b are axially aligned with each other to form a pair of second axially extending ribs. These ribs are circumferentially aligned such that adjacent pairs of the ribs are opposed to one another to form support pair of ledges in each of the slots 24 adjacent the openings 27.

Figure 11:
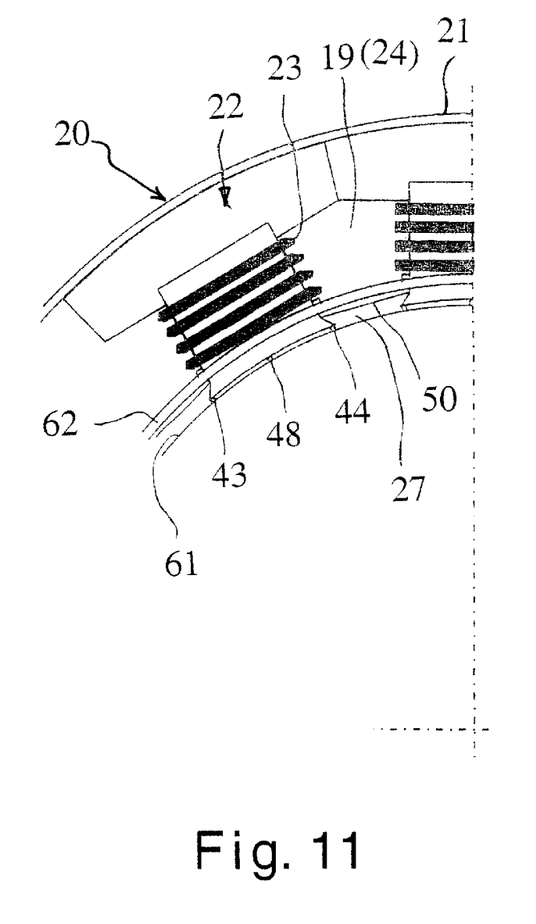
FIG. 11 is a partial end view of the partially assembled stator showing an mold installed below the protrusions on the inner peripheral surfaces of the stator core sections, and an outer mold installed radially outward from the inner mold at the end of the stator to be installed in the rotary electric machine of FIG. 1.
Figure 12:
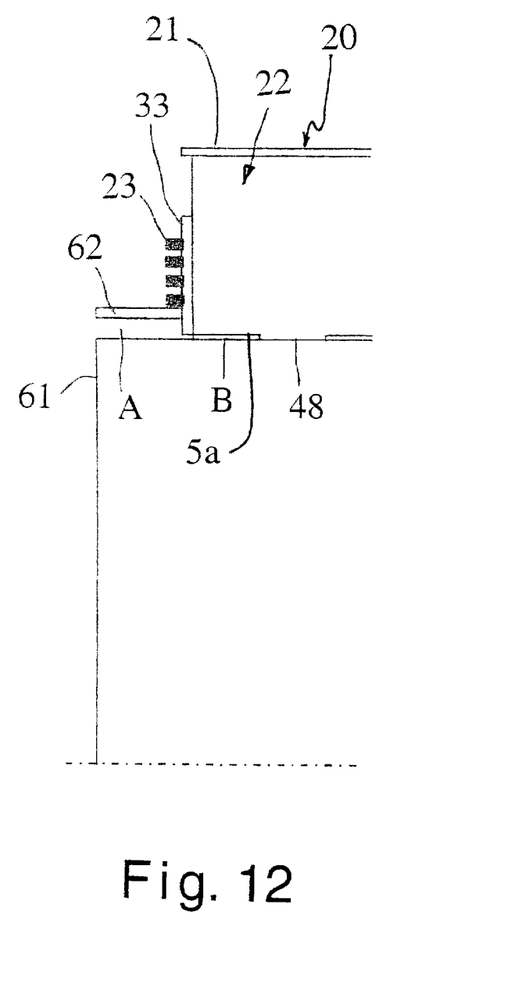
FIG. 12 is a partial axial cross-sectional view showing an mold installed below the protrusions on the inner peripheral surfaces of the stator core sections, and an outer mold installed radially outward from the inner mold at the end of the stator to be installed in the rotary electric machine of FIG. 1.

Next, as shown in FIGS. 11 and 12, a cylindrical internal mold 61 is inserted into the center opening of the stator core 20 such that the outer circumferential surface of the cylindrical internal mold 61 is positioned in close contact with the protrusions 43, 44 and 48 formed on the stator core sections 22. While only one end of the stator 5 is illustrated in FIG. 11, it will be apparent to those skilled in the art from this disclosure that that the other end of the stator 5 is the mirror image of the end of the stator 5 illustrated in FIG. 11. Thus, the cylindrical internal mold 61 extends outwardly from both of the axially facing ends of the stator 5 to form the end sealing sections 6b and 6c as explained below. The position of the cylindrical internal mold 61 is accurately maintained by the protrusions 43, 44 and 48 on the stator core sections 22 that make up the stator core 20. In particular, the protrusions 43, 44 and 48 maintain the cylindrical internal mold 61 at an equal and uniform spacing with respect to the entire inner circumferential surface 6a of the stator core 20.

Figure 13:
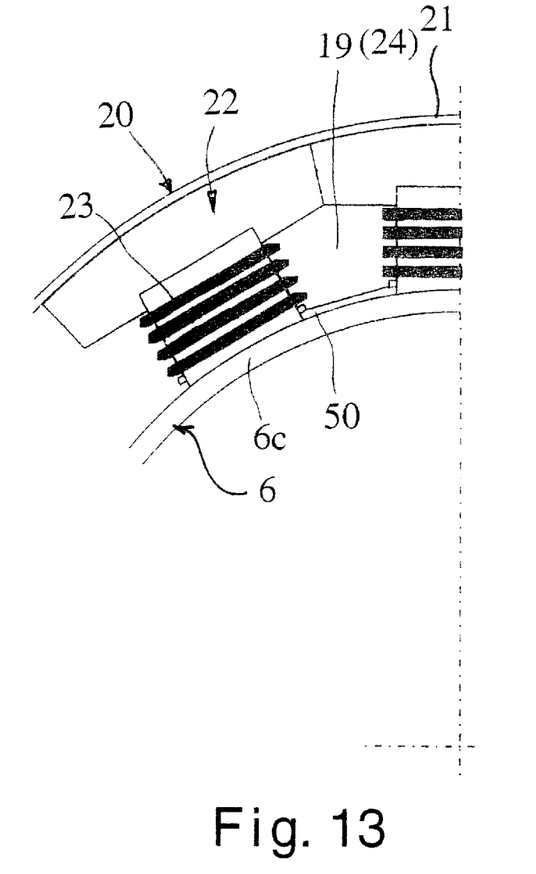
FIG. 13 is a partial end view of the assembled stator showing a plurality of the stator core sections of the stator core with a resin material molded to the stator core sections to form a cylindrical seal for the rotary electric machine of FIG. 1.
Figure 14:
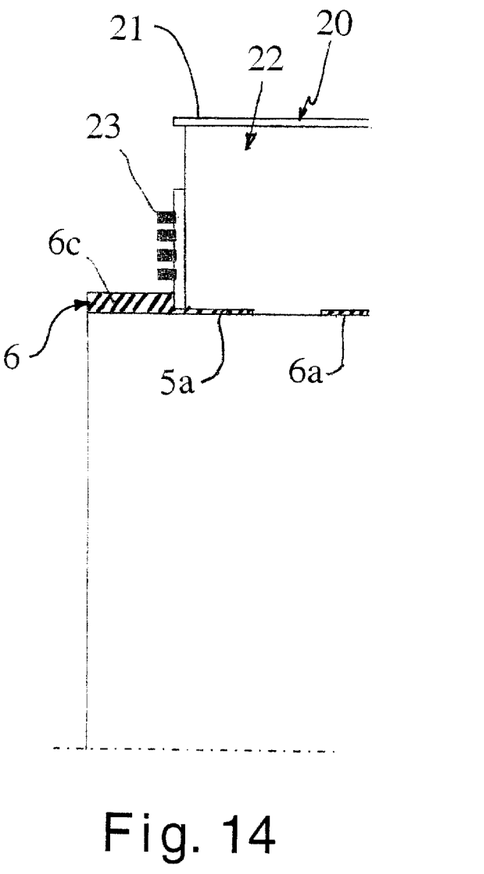
FIG. 14 is partial axial cross-sectional view of the stator core illustrated in FIG. 13 with the resin material molded to the stator core to form the cylindrical seal.

Also, a pair of cylindrical external molds 62 (only one shown) are arranged radially outward from the ends of the cylindrical internal mold 61 at both axially facing ends of the stator 5. FIG. 12 shows one of the cylindrical external molds 62 arranged at one of the axially facing ends of the stator 5. A prescribed radial gap is provided between the cylindrical internal mold 61 and the cylindrical external molds 62 at both axially facing ends of the stator 5, so as to form an annular space A. The plates 50 that are arranged in each slot 24 of the stator core 20 are set such that they overlap with the cylindrical external molds 62 when viewed from the axial direction as seen in FIG. 11. An annular space B is formed between the plates 50 and the cylindrical internal mold 61 and extends in the axial direction. The annular space B only communicates with the annular space A inside the cylindrical external molds 62. With the cylindrical internal mold 61 and the cylindrical external mold 62 being set as described above, a space between these molds is filled with a resin material. Thus, when the sealing member 6 is formed by injection molding, the cylindrical internal mold 61 cooperates with the plates and the cylindrical external molds 62 to form the center sealing section or resin layer 6a of the sealing member 6 on the inner peripheral surface 5a of the stator 5 and the end sealing sections 6b and 6c that extend outwardly from the axially facing ends of the stator 5. As a result, as shown in FIGS. 13 and 14, the resin layer 6a having a film layer of uniform thickness is formed on the inner peripheral surface 5a of the stator 5. Furthermore, at each of the axially facing ends of the stator 5, the end sealing sections 6b and 6c are formed. The resin layer 6a and the end sealing sections 6b and 6c are formed integrally with each other as a one-piece, unitary member. FIG. 14 shows that the end sealing sections 6b and 6c of the sealing member 6 have thicker radial dimensions than the resin layer 6a.

As noted above, the cylindrical internal mold 61 is positioned by the protrusions 43, 44 and 48 on the stator core sections 22 that make up the stator core 20. Thus, the protrusions 43, 44 and 48 maintain the cylindrical internal mold 61 at an equal and uniform spacing with respect to the stator core 20 around the entire inner circumferential surface 5a of the stator core 20. Thus, as shown in FIG. 14, the radial thickness of the thin resin layer 6a of the sealing member 6 and the radial thickness of the protrusions 43, 44 and 48 are substantially equal in the radial thickness.

As mentioned above, the bottom surfaces 42 and 47 of the tooth parts 22b of the first and second magnetic core plates 31 and 32 form an inside circumferential surface or an inner peripheral surface 5a of the stator core 20. The thin film resin layer 6a is formed around the entire inner circumferential surface or inner peripheral surface 5a of the stator core 20. The protrusions 43, 44 and 48 are set to the same identical radial thickness. As a result, the protrusions 43, 44 and 48 make it possible to maintain a uniform distance between the inside surface of the stator 5 and a mold 61 that is arranged inside the stator 5 around the entire circumference of the stator 5, as shown in FIGS. 11 and 12. The resin layer 6a has a single thickness is formed on the inside surface of the stator 5 so as to block the openings of the slots 24 facing the outer circumference of the rotor 2. Thus, when the cooling liquid flows through the cooling medium paths 19, cooling liquid can be reliably prevented from leaking to the inside of the stator 5 through gaps in the first and second magnetic core plates 31 and 32 that form the stator core sections 22.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-257151. The entire disclosure of Japanese Patent Application No. 2001-257151 is hereby incorporated herein by reference.

While only the selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents. Thus, the scope of the invention is not limited to the disclosed embodiment.

What is claimed is:

1. A stator structure for a rotary electric machine comprising:
    an annular stator core including a plurality of axially extending slots and an inner peripheral surface defining a rotor receiving opening with a center axis;
    a plurality of protrusions extending from the inner peripheral surface of the stator ore, the protrusions having a predetermined radial thickness; and
    an annular resin layer formed on the inner peripheral surface of the stator core, the annular resin layer having a radial thickness along inner peripheral surface of the stator core that is substantially equal to the radial thickness of the protrusions.

2. The stator structure according to claim 1, wherein the stator core includes a plurality of magnetic core plates layered together in an axially direction to form the stator core.

3. The stator structure according to claim 2, wherein the magnetic core plates and the protrusions are integrally formed as a one-piece, unitary member by die punching the magnetic core plates.

4. The stator structure according to claim 1, wherein the stator core comprises a plurality of separate stator core sections that are circumferentially arranged with each of the stator core sections having an inside surface that forms a portion of the inner peripheral surface, the protrusions being disposed on at least some of the inside surfaces of the stator core sections.

5. The stator structure according to claim 4, wherein each of the stator core sections includes a plurality of magnetic core plates layered together in an axially direction to form each of the stator core sections with the protrusions being disposed on at least some of the magnetic core plates.

6. The stator structure according to claim 5, wherein the magnetic core plates and the protrusions are integrally formed as a one-piece, unitary member by die punching the magnetic core plates.

7. The stator structure according to claim 5, wherein said magnetic core plates includes first core plates having a first shape and second core plates of a second shape that is different from the first shape of the first core plates.

8. The stator structure according to claim 7, wherein each of the stator core sections includes a plurality of the first core plates layered together in an axially direction to form a first set and a plurality of the second core plates layered together in an axially direction to form a second set.

9. The stator structure according to claim 8, wherein the protrusions includes first protrusions that are formed on the first core plates and second protrusions that are formed on the second core plates with the first protrusions being located at different circumferential positions from the second protrusions for each of the stator core sections.

10. The stator structure according to claim 9, wherein each of the first core plates includes a pair of the first protrusions circumferentially spaces apart on the inside surface of the stator core sections, and each of the second core plates includes one of the second protrusions substantially centered in a circumferential direction along the inside surfaces of the stator core sections.

11. A stator structure comprising:

stator core means for winding stator coils, said stator core means having an inner peripheral surface and slots;

protrusion means for providing a uniform radial gap on the inner peripheral surface of said stator core means; and sealing means for covering the inner peripheral surface of the stator core means and for blocking the slots of the stator core means.

\* \* \* \* \*